May 3, 1927.
F. GLAESENER
1,626,811
AGRICULTURAL IMPLEMENT
Filed Oct. 9, 1925
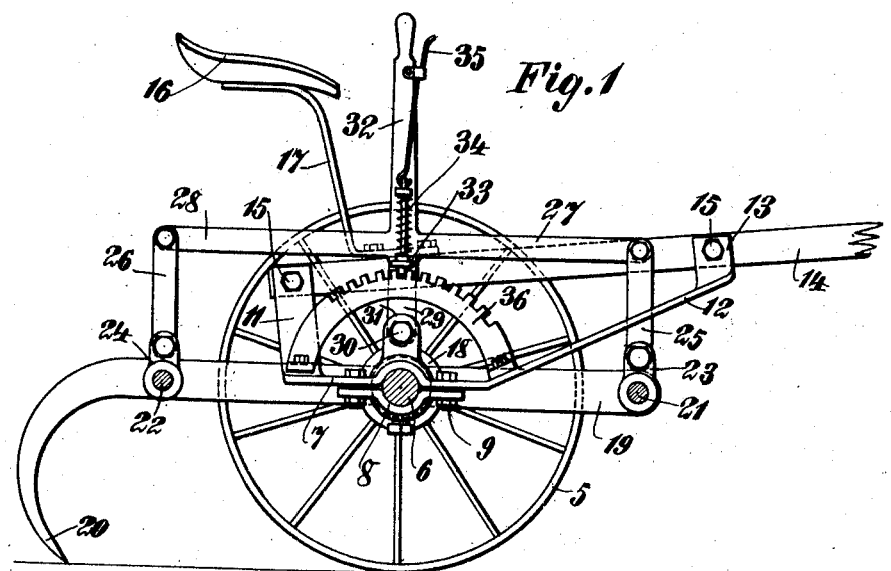
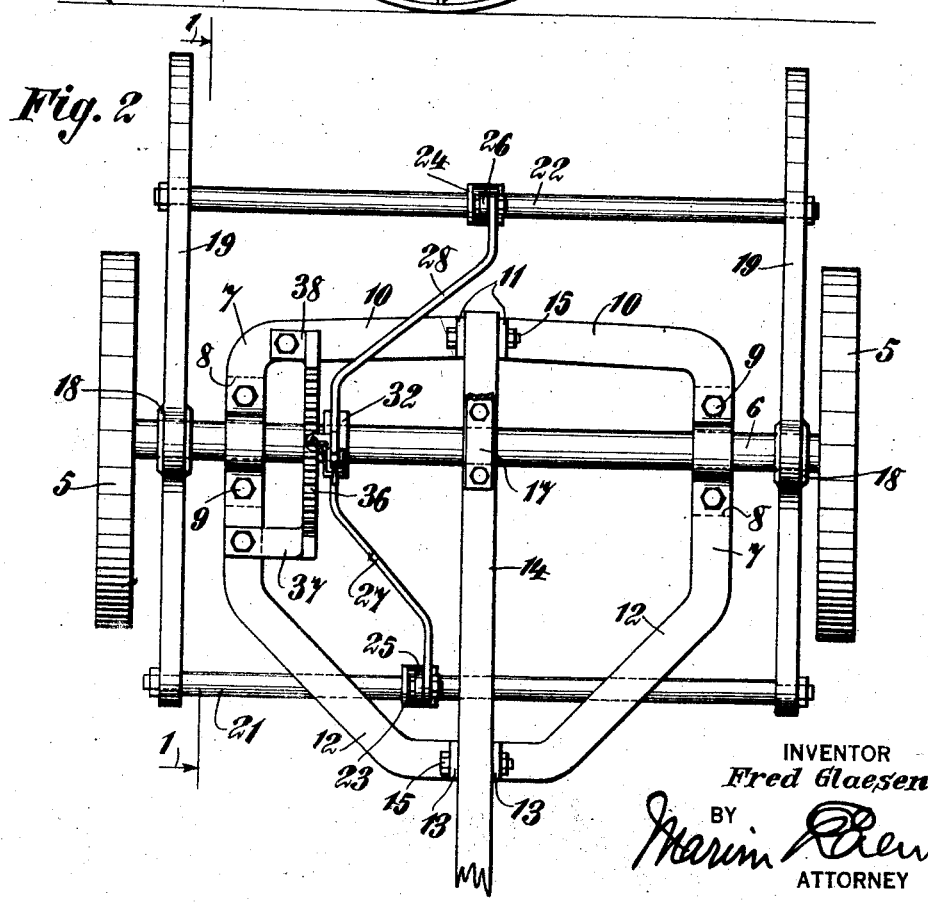
INVENTOR
*Fred Glaesener.*
BY
ATTORNEY Patented May 3, 1927.

1,626,811

UNITED STATES PATENT OFFICE.

FRED GLAESENER, OF CASTLEFORD, IDAHO.

AGRICULTURAL IMPLEMENT.

Application filed October 9, 1925. Serial No. 61,388.

This invention relates to improvements in agricultural implements and particularly to devices for making narrow parallel furrows or trenches in the soil preparatory to planting seeds, bulbs or roots therein.

One of the objects of the invention is to provide an animal drawn implement, provided with a seat for an operator, and having a pair of rigid, spaced hook-like shovels mounted at the rear to engage the soil.

Another object is to provide a wheeled structure in which the shovels may be raised and lowered, relatively to the plane on which the wheels rest, and maintained in adjustment.

A further object is in the provision of means whereby the shovels may be raised above the surface or lowered to any depth below the surface as may be desired, and at such intervals as the operator may elect.

These and other like objects are attained by the novel construction and disposition of parts hereinafter described and shown in the accompanying drawing, forming a material part of this disclosure, and in which:—

Figure 1 is a partial side elevational, partial sectional view of an embodiment of the invention, the section being taken on line 1—1 of Figure 2.

Figure 2 is a top plan view of the same, the seat support and control lever being broken away.

Referring to the drawing more in detail, the numeral 5 designates a pair of broad faced wheels of the type used in such structures, the wheels being arranged on an axle 6.

Mounted on the axle are spaced frame elements 7 held by clamps 8 secured by bolts 9; the rear portions of the frame are bent inwardly at right angles as at 10 and terminate in raised flanges 11.

The front portions 12 are bent convergingly inward and slightly raised, terminating in upright flanges 13.

A beam 14 is secured between the flanges 11 by a bolt 15, a similar bolt passing through the front flanges.

A seat 16, carried by a spring support 17 bolted to the beam 14, is provided for the operator, the seat extending rearward of the axle as shown.

Rotatably mounted on the axle, adjacent the wheels, are collars 18, intermediate the length of a pair of bars 19, the rear ends of which are reduced in width and curved downwardly towards the front to produce shovels 20.

These bars are rigidly connected by rods 21 and 22, respectively at the front and rear, and fixed substantially central of these rods are lugs 23 and 24, connected pivotally with links 25 and 26.

These links are pivoted at their upper ends to arms 27 and 28 formed on a lever 29, pivoted at 30 on a lug 31 carried by a collar 32 loosely encircling the axle 6, and extending upward, opposite the pivoted lever 29, is a lever 32 by which the shovels are raised and lowered in unison, the hand lever being arranged convenient of access by an operator in the seat 16.

A detent 33, normally pressed downward by a spring 34, is under control of a release lever 35 pivoted to the hand lever 32, the detent normally engaging the spaces in a toothed sector 36, having outturned arms 37 and 38 bolted to the adjacent frame elements 12 and 7 as can best be seen in Figure 2.

In operation the hand lever may be adjusted to maintain the shovels at any desired height relative to the surface to produce trenches of required depth, or the shovels may be raised and lowered to produce spaced hills if preferred.

Having thus described my invention, what I claim as new and desire to secure by Letters Patent, is:—

1. An agricultural implement comprising an axle having wheels at its ends, a frame directly mounted on said axle, a draw beam supported by said frame, a notched segment fixed on the frame, a lever pivoted on the axle, said lever having a part adapted for hand operation, a detent on said lever engageable with said notched segment, arms on said lever extending laterally in opposite directions, shovel elements pivoted on said axle, and links connecting the shovel elements with said arms.

2. An agricultural implement comprising an axle having wheels at its ends, a frame directly mounted on said axle, a draw beam supported by said frame, a notched segment fixed on the frame, a lever pivoted on the axle, said lever having a part adapted for hand operation, a detent on said lever engageable with said segment, arms on said lever extending laterally in opposite directions, a seat fixed on said beam adjacent the hand lever, bars pivoted on said axle, shovel elements integral with the rear ends of said bars, rods connecting said bars, and link connections between said rods and the ends of said arms.

In witness whereof I have affixed my signature.

FRED GLAESENER.